United States Patent
Yao

(10) Patent No.: US 7,613,735 B2
(45) Date of Patent: Nov. 3, 2009

(54) METHOD AND APPARATUS FOR MANAGING MULTIMEDIA CONTENT

(75) Inventor: Bin Yao, Plainsboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 226 days.

(21) Appl. No.: 11/423,746

(22) Filed: Jun. 13, 2006

(65) Prior Publication Data

US 2007/0294254 A1    Dec. 20, 2007

(51) Int. Cl.
*G06F 17/00* (2006.01)
(52) U.S. Cl. ............... 707/104.1; 707/101; 707/102; 707/103 R
(58) Field of Classification Search ......... 707/1–10, 707/100–104.1, 200–206
See application file for complete search history.

(56) References Cited

U.S. PATENT DOCUMENTS

| | | | |
|---|---|---|---|
| 6,639,615 B1 | 10/2003 | Majumdar et al. | |
| 2001/0007960 A1* | 7/2001 | Yoshihara et al. | 700/94 |
| 2002/0059621 A1* | 5/2002 | Thomas et al. | 725/87 |
| 2002/0069420 A1 | 6/2002 | Russell et al. | |
| 2003/0040962 A1 | 2/2003 | Lewis | |

FOREIGN PATENT DOCUMENTS

WO    WO 2005/124591 A    12/2005

* cited by examiner

*Primary Examiner*—Isaac M Woo
(74) *Attorney, Agent, or Firm*—Wall &Tong, LLP

(57) ABSTRACT

The invention includes a system, apparatus, and method for storing media content within a service provider network. The system includes multi-service servers associated with access points adapted to allow end-user devices to access the service provider network. Each multi-service server includes a common storage partition adapted for storing media content and a plurality of end-user storage partitions adapted for maintaining associations to media content. The system includes media servers that communicate with the multi-service servers for providing media content to the multi-service servers. In response to a request for media content received from one of a plurality of end-user devices, the requested media content stored in the common storage partition is associated with a selected one of the end-user storage partitions associated with the end-user. The request for media content is received in response to end-user directed advertisements received at any of the plurality of end-user devices.

17 Claims, 6 Drawing Sheets

100

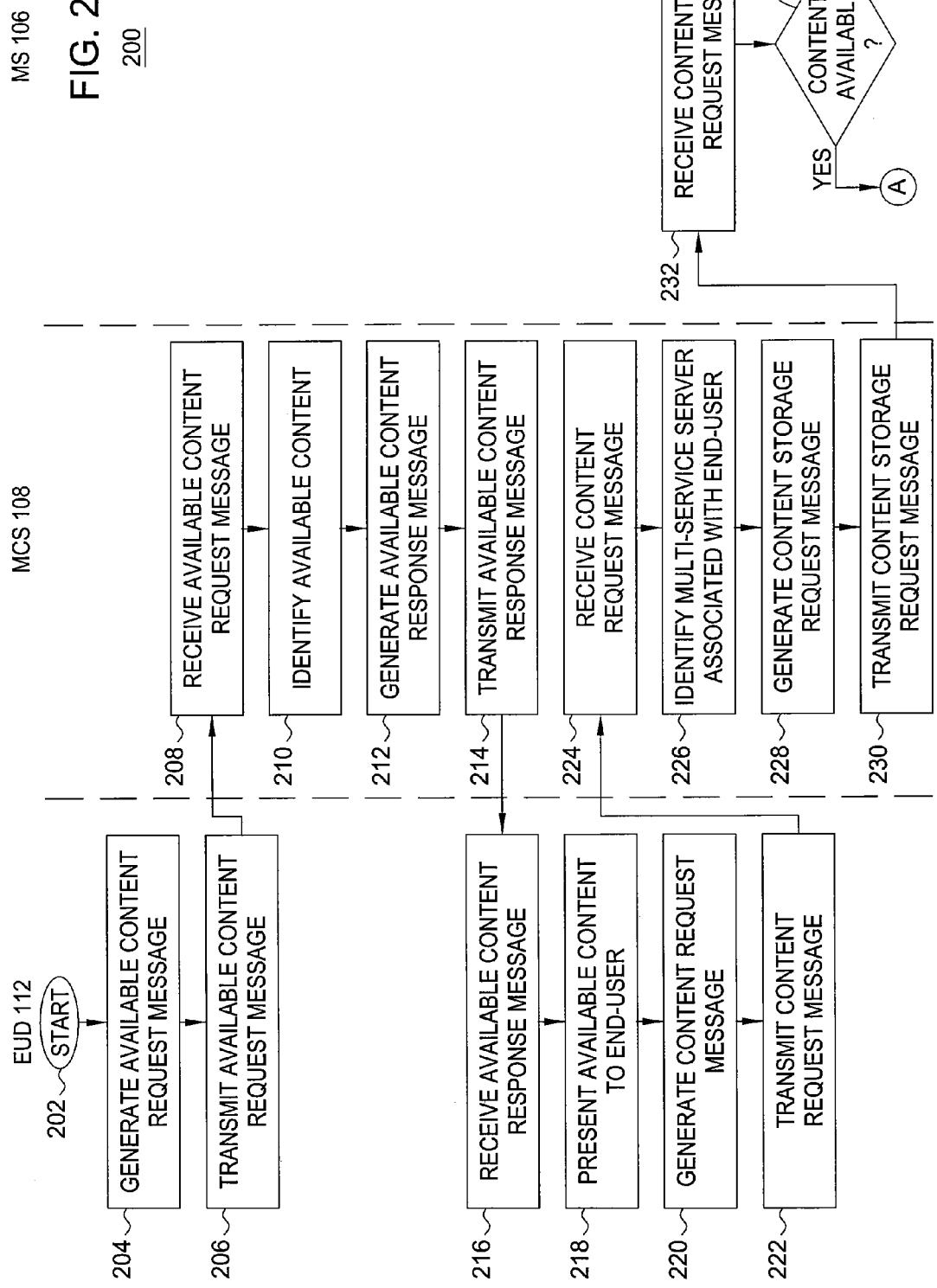

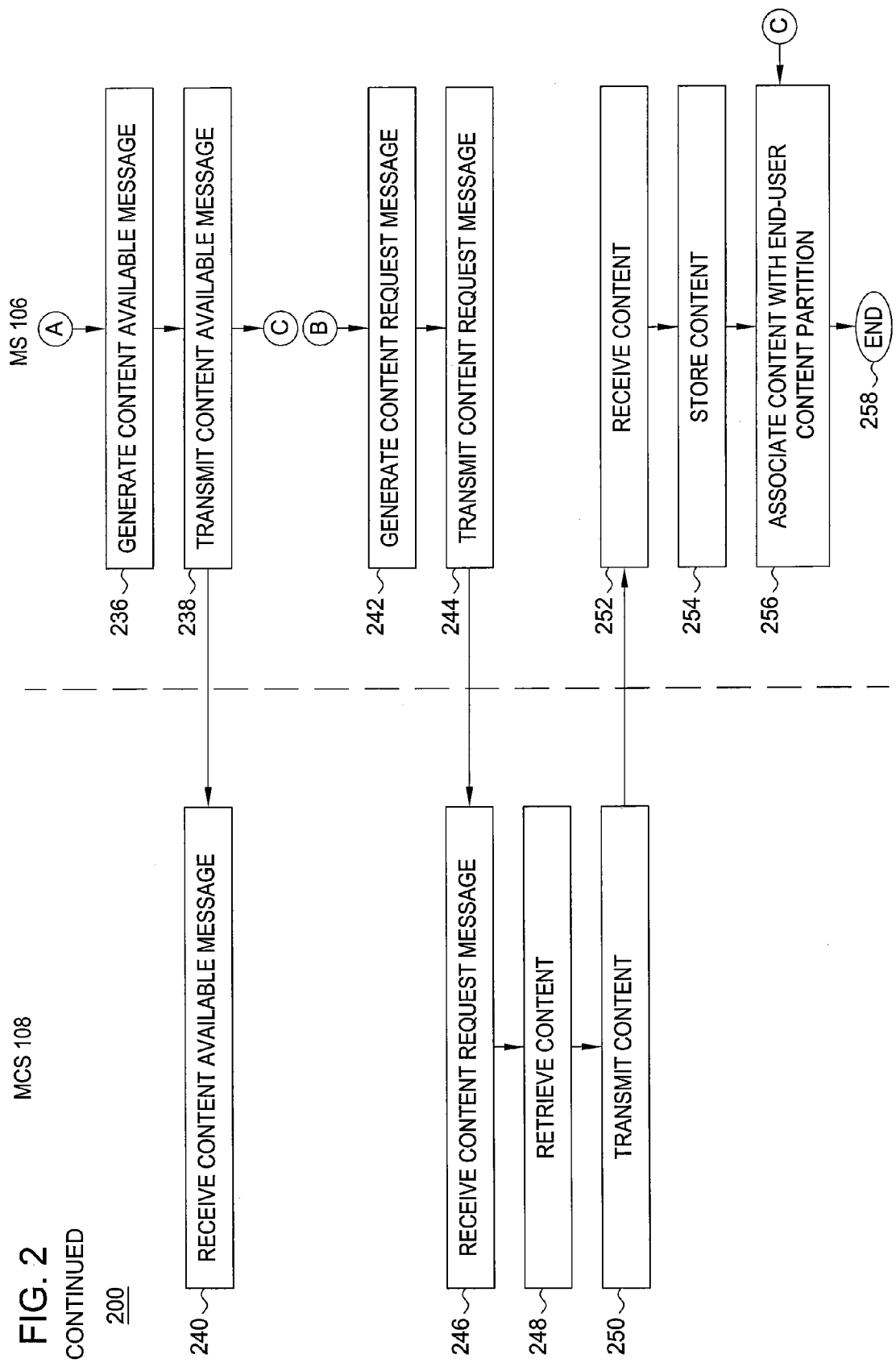

METHOD AND APPARATUS FOR MANAGING MULTIMEDIA CONTENT

FIELD OF THE INVENTION

The invention relates to the field of communication networks and, more specifically, to multimedia services in telecommunications networks.

BACKGROUND OF THE INVENTION

In existing communication networks, end-users may request network-based content (e.g., text, images, audio, video, and the like) available from media content servers. Disadvantageously, however, existing media content servers may be slow and, therefore, unsuitable for high-bandwidth multimedia services (e.g., online video rentals). Furthermore, since such high-bandwidth multimedia services use a combination of content streaming and storing, end-user devices with limited storage and processing capabilities (e.g., cellular phones) cannot support many high-bandwidth multimedia services (e.g., mobile music and video downloads). Moreover, existing multimedia storage solutions do not provide back-up services for storing end-user generated content.

SUMMARY OF THE INVENTION

Various deficiencies in the prior art are addressed through the invention of a system, apparatus, and method for storing media content within a service provider network. The system includes multi-service servers associated with access points adapted to allow end-user devices to access the service provider network. Each multi-service server includes a common storage partition adapted for storing media content and a plurality of end-user storage partitions adapted for maintaining associations to media content. The system includes media servers that communicate with the multi-service servers for providing media content to the multi-service servers. In response to a request for media content received from one of a plurality of end-user devices, the requested media content stored in the common storage partition is associated with a selected one of the end-user storage partitions associated with the end-user. The request for media content is received in response to end-user directed advertisements received at any of the plurality of end-user devices.

BRIEF DESCRIPTION OF THE DRAWINGS

The teachings of the present invention can be readily understood by considering the following detailed description in conjunction with the accompanying drawings, in which:

FIG. 2 depicts a method according to one embodiment of the present invention;

To facilitate understanding, identical reference numerals have been used, where possible, to designate identical elements that are common to the figures.

DETAILED DESCRIPTION OF THE INVENTION

The present invention provides per-end-user content storage using an end-user content storage partition in a service provider network. The end-user content storage partition is manageable by both service provider and end-user, enabling the service provider and the end-user to add and remove content, and enabling the end-user to access content stored in the end-user content storage partition. By implementing per-end-user storage, the present invention thereby enables improvements to existing multimedia services (e.g., streaming media services, content backup and access services, and the like) and support for new multimedia services (e.g., fixed and mobile multimedia content advertising, previewing, purchasing, renting, and the like, as well as various combinations thereof). Using the present invention, end-users may access multimedia content from various locations using a variety of end-user devices.

In one embodiment, by maintaining an end-user content storage partition on one or more servers close to one or more of the end-user devices by which an end-user accesses the service provider network (i.e., near the edge of the service provider network), the present invention thereby enables improved content management capabilities, improved bandwidth utilization, reduced content access latency, and the like, as well as various combinations thereof). In one embodiment, content requested by an end-user from the end-user content storage partition using an end-user device may be formatted according to one or more device characteristics of the end-user device from which the end-user initiates the content retrieval request.

Figure 1:
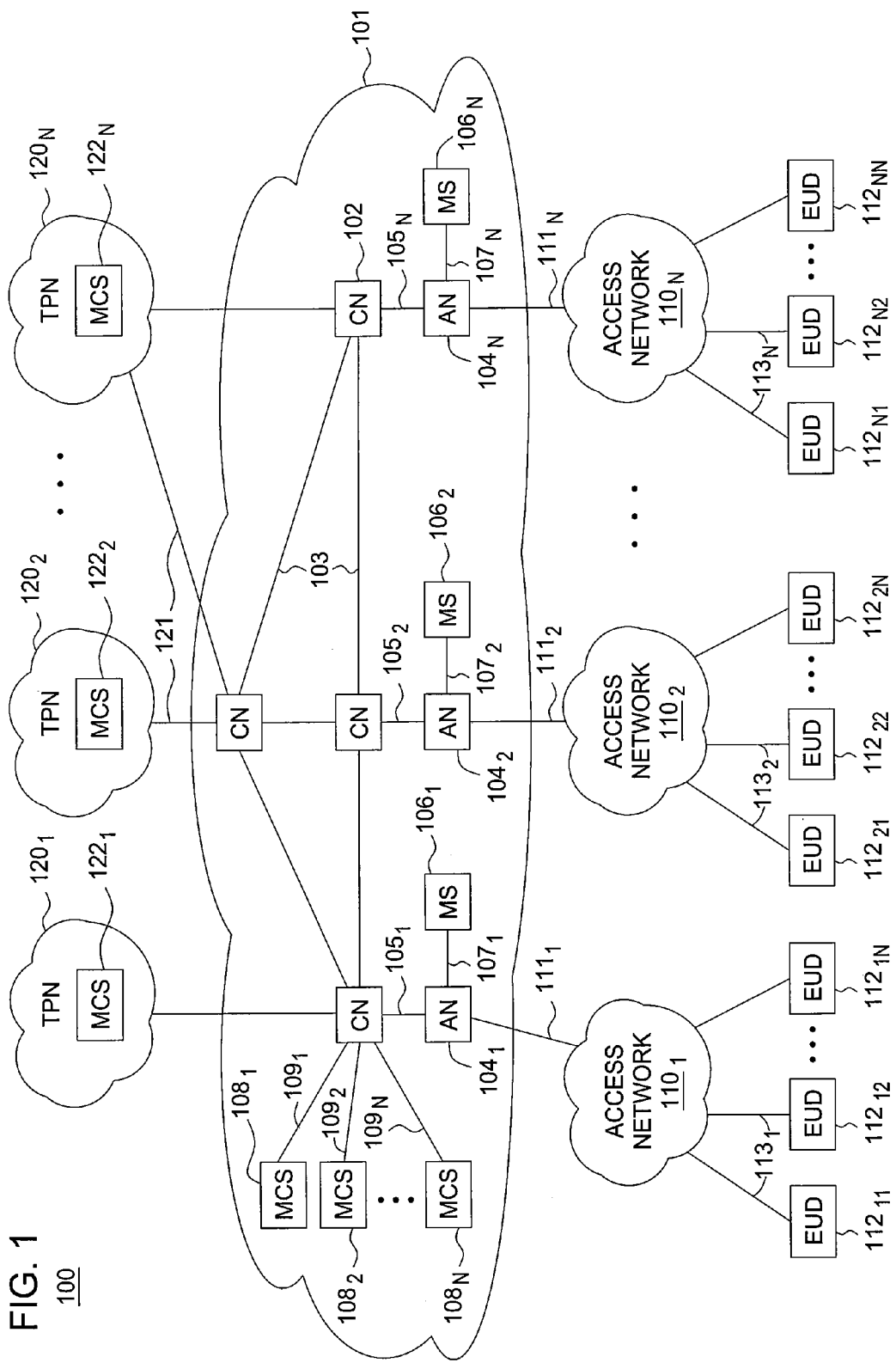
FIG. 1 depicts a high-level block diagram of a communication network.

FIG. 1 depicts a high-level block diagram of a communication network. Specifically, communication network 100 includes a service provider network 101, a plurality of access networks (ANs) $110_1$-$110_N$ (collectively, ANs 110), and a plurality of third-party networks (TPNs) $120_1$-$120_N$ (collectively, TPNs 120). The ANs 110 enable communication between SPN 101 and respective pluralities of end-user devices (EUDs). Specifically, ANs $110_1$-$110_N$ enable communication between SPN 101 and respective pluralities of EUDs $112_{11}$-$112_{1N}$ (collectively, EUDs $112_1$), EUDs $112_{21}$-$112_{2N}$ (collectively, EUDs $112_2$), and EUDs $112_{N1}$-$112_{NN}$ (collectively, EUDs $112_N$), respectively. The EUDs $112_1$, $112_2$, and $112_N$ may be collectively referred to as EUDs 112. The EUDs $112_1$, $112_2$, and $112_N$ communicate with ANs $110_1$, $110_2$, and $110_N$ using respective pluralities of communication links (CLs) $113_1$, $113_2$, and $113_N$ (collectively, CLs 113).

The ANs 110 include any access networks operable for supporting communications between EUDs 112 and SPN 101. In one embodiment, ANs 110 include access networks adapted for supporting IP-based communications. For example, ANs 110 may include wireline access networks (e.g., cable access networks, digital subscriber line (DSL) access networks, Ethernet access networks, and the like, as well as various combinations thereof), wireless networks (e.g., code division multiple access (CDMA) access networks, general packet radio service (GPRS) access networks, wireless local area network (WLAN) access networks, and the like, as well as various combinations thereof), and the like, as well as various combinations thereof.

The EUDs 112 may include any end-user devices operable for establishing communication connections/sessions, capturing and transmitting content, receiving and presenting content, and performing like functions, as well as various combinations thereof. For example, EUDs 112 may communicate with other EUDs 112 (e.g., voice communications, instant message communications, and the like), access network-based content (e.g., access various combinations of text, image, audio, video, and like content from one or more of SPN 101 (e.g., from one or more of MCSs 108, one or more of MSs 106, and the like), ANs 110, TPNs 120 (e.g., from MCSs 122), and the like, as well as various combinations thereof). For example, EUDs 112 may include computers (e.g., desktop, laptop, and the like), phones (e.g., IP phones, cellular phones, and the like), personal data assistants (PDAs), and the like).

In one embodiment, an end-user may access a service provider network (illustratively, SPN 101) using multiple end-user devices (illustratively, EUDs 112). For example, an end-user may access SPN 101 from work using a desktop computer over a DSL access network (illustratively, for example, using EUD 112$_{11}$ via AN 110$_1$), from home using a laptop computer over a cable access network (illustratively, for example, using EUD 112$_{21}$ via AN 110$_2$), and away from work and home using a wireless phone over a wireless access network (illustratively, for example, using EUD 112$_{N1}$ via AN 110$_N$).

The SPN 101 includes a plurality of core nodes (CNs) 102 (collectively, CNs 102) in communication using a plurality of core links (CLs) 103 (collectively, CLs 103). In one embodiment, CNs 102 include network elements operable for supporting IP-based communications. The CNs 102 communicate with TPNs 120 using a plurality of access links (ALs) 121 (collectively, ALs 121). The CNs 102 may communicate with various network elements of TPNs 120$_1$-120$_N$, respectively. Although depicted as communicating with TPNs 120 directly, in one embodiment, communication between CNs 102 and TPNs 120 may traverse various other networks, nodes (e.g., core nodes, access nodes, and the like) and links, as well as various combinations thereof.

The SPN 101 includes a plurality of access nodes (ANs) 104$_1$-104$_N$ (collectively, ANs 104). In one embodiment, ANs 104 include network elements operable for supporting IP-based communications. The ANs 104 communicate with CNs 102 using a respectively plurality of access links (ALs) 105$_1$-105$_N$ (collectively, ALs 105), respectively. The ANs 104$_1$-104$_N$ operate as access gateway nodes for ANs 110$_1$-110$_N$, respectively. The ANs 104$_1$-104$_N$ may communicate with various network elements of ANs 110$_1$-110$_N$, respectively. Although depicted as communicating with ANs 110 directly, in one embodiment, communication between ANs 104 and ANs 110 may traverse various other networks, nodes, and links, as well as various combinations thereof.

The SPN 101 includes a plurality of media content servers (MCSs) 108$_1$-108$_N$ (collectively, MCSs 108). The MCSs 108 include servers operable for storing content (e.g., text, image, audio, video, and the like, as well as various combinations thereof). The MCSs 108 include servers operable for providing content to EUDs 112 (e.g., in response to user-initiated content retrieval requests (e.g., content requests received from EUDs 112), in response to network-initiated content retrieval requests (e.g., content requests initiated by MCSs 108 and/or received from other network elements), and the like). The MCSs 108 may provide content to EUDs 112 using any protocol (e.g., Hypertext Transfer Protocol (HTTP) for image content, Real Time Protocol (RTP) for video content, and the like). In one embodiment, MCSs 108 are operable for performing at least a portion of the functions of the present invention.

In one embodiment, MCSs 108 may advertise available content (e.g., content stored by respective MCSs 108) to EUDs 112. The MCSs 108 may advertise available content to EUDs 112 using content advertisements which are directed toward EUDs 112 (which may be generally referred to as end-user directed advertisements). An end-user directed advertisement may be more generally defined to include any advertisement which is directed from the network (illustratively, any network-based component) to an end-user at one or more associated EUDs 112. An end-user directed advertisement may be initiated in response to a request by the network (i.e., the network pushes advertisements to end-users) or may be initiated in response to a request by the end-user.

In one embodiment, one or more end-user directed advertisements may be delivered from the network to an EUD 112 using one or more available content messages. In one such embodiment, MCSs 108 generate available content messages for transmission to EUDs 112 in order to advertise to EUDs 112 content stored by respective MCSs 108. In one embodiment, available content messages may be generated by MCSs 108 in response to requests from EUDs 112. In one such embodiment, requests from EUDs 112 may include generic requests for content (e.g., request for most popular content), specific requests for content (e.g., request for all movies having car chase scenes), and the like, as well as various combinations thereof. In one embodiment, available content messages may be generated by MCSs 108 in response to one or more local conditions (e.g., conditions local to MCSs 108). In one embodiment, available content messages may be generated by MCSs 108 in response to requests from other network-based network elements (e.g., content advertisement management systems).

In one embodiment, MCSs 108 may transfer content to MSs 106. In one embodiment, MCSs 108 transfer content to MSs 106 in response to requests from EUDs 112. In one such embodiment, MCSs 108 transfer content to MSs 106 in response to preview requests, rental requests, purchase requests, and the like. In one embodiment, in response to a request to transfer content to one of the MSs 106, one of the MCSs 108 (i.e., MSC 108 which receives the request to transfer the content) may transfers the content to MS 106. In one embodiment, in response to a request to transfer content to one of the MSs 106, one of the MCSs 108 (i.e., MSC 108 which receives the request to transfer the content) may determine whether the content is stored on MS 106. In one such embodiment, if the content is not stored on MS 106, MSC 108 transfers the content to MS 106 for storage on MS 106, or, if the content is stored on MS 106, MS 106 associates the content with the end-user (e.g., map the content to an end-user content storage partition associated with the end-user).

The SPN 101 communicates with TPNs 120, which may include any networks operable for storing content (e.g., content owner networks (e.g., Lucent Technologies servers), content provider networks (e.g., Google servers), other service provider networks, and the like, as well as various combinations thereof). As depicted in FIG. 1, TPNs 120$_1$-120$_N$ include a plurality of media content servers (MCSs) 122$_1$-122$_N$ (collectively, MCSs 122), respectively, operable for storing content. In one embodiment, at least a portion of MCSs 122 may be operable for performing at least a portion of the functions of the present invention (e.g., providing content advertisements (denoted as end-user directed advertisements) to EUDs 112 using SPN 101, depositing content onto end-user content partitions maintained within SPN 101, and the like, as well as various combinations thereof).

The SPN 101 includes a plurality of multi-service servers (MSs) 106$_1$-106$_N$ (collectively, MSs 106). The MSs 106 may each include one or more content servers operable for storing, retrieving, and providing content (e.g., text, image, audio, video, and the like, as well as various combinations thereof)

to EUDs 112. The MSs 106 may each include one or more content storage devices for storing content. In one such embodiment, content servers of MSs 106 may retrieve requested content from content storage devices of MSs 106. The MSs 106 include servers operable for providing content to EUDs 112 (e.g., in response to user-initiated content requests (e.g., content requests received from EUDs 112)). Although depicted as standalone elements, in one embodiment, at least a portion of the functions of MSs 106 may be implemented as a portion of ANs 104, respectively. In one embodiment, MSs 106 are operable for performing at least a portion of the functions of the present invention.

As described herein, the present invention provides network-based, per-end-user content storage functions. In one embodiment, a network-based content partition is established and maintained for each end-user (denoted as an end-user content partition, an end-user storage partition, or an end-user content storage partition). In one embodiment, an end-user content partition may be established on one MS 106. In one embodiment, an end-user content partition may be established across multiple MSs 106. In one embodiment, an end-user content partition may be established as a physical partition (e.g., of one or more MSs 106). In one embodiment, an end-user content partition may be established as a logical partition (e.g., of one or more MSs 106). In one embodiment, an end-user content partition may be established as a combination of physical and logical partitions (e.g., of one or more of MSs 106).

In one embodiment, one or more of MSs 106 on which the associated end-user content partition is established may be selected by the service provider (e.g., randomly selecting one or more of MSs 106, selecting one MS 106 associated with AN 110 by which the end-user accesses SPN 101, selecting one or more MSs 106 associated one or more ANs 110 by which the end-user accesses SPN 101, selecting one of the MSs 106 associated with one of the ANs 110 by which the end-user primarily accesses SPN 101, and the like). In one embodiment, one or more of MSs 106 on which the associated end-user content partition is established may be selected by the end-user (e.g., while subscribing to the content partition service), and may be subsequently modified by the end-user.

In one embodiment, the end-user content partition is established close to the associated end-user. In one embodiment, in which the end-user accesses SPN 101 using one EUD 112, the end-user content partition may be established on the MS 106 associated with the AN 104 in communication with AN 110 by which the end-user accesses SPN 101 (e.g., on MS 106$_1$ for an end-user accessing SPN 101 using EUD 112$_{11}$). In one embodiment, in which the end-user accesses SPN 101 using multiple EUD 112, the end-user content partition may be established on one or more of the MSs 106 associated with respective one or more of the ANs 104 by which the end-user accesses SPN 101 (e.g., on MS 106, for an end-user accessing SPN 101 from home using EUD 112$_{11}$ and accessing SPN 101 from work using EUD 112$_{22}$).

In one embodiment, MSs 106 may store at least a portion of the content in a common content partition. In one such embodiment, content associated with multiple end-user content partitions (i.e., requested by multiple end-users with end-user content partitions on the MS 106) may be stored in a common content partition (rather than storing multiple copies of the same content for each of the multiple end-users which requested the content). The MS 106 maintains mappings between content stored in the common content partition and end-user content partitions of end-users authorized to access the content. For example, if multiple end-users having end-user content partitions on one MS 106 (illustratively, MS 106$_1$) order the same movie, rather than storing multiple copies of the movie on MS 106$_1$, MS 106$_1$ stores one copy of the movie and maintains a mapping between the movie and each of the end-user content partitions.

As described herein, MSs 106 provide content to EUDs 112. In one embodiment, MSs 106 provide content to EUDs 112 in response to requests for content received from respective EUDs 112. In one embodiment, MSs 106 may adapt requested content before providing the requested content to the associated EUD 112. In one such embodiment, MSs 106 may determine at least one device characteristic associated with the EUD 112 from which the end-user initiates the request for content (e.g., video player available on the computer, screen size of a cellular phone, and the like). The MSs 106 may adapt the requested content according to the device characteristic(s) before providing the requested content to the associated EUD 112. The MSs 106 may provide content to EUDs 112 using any protocol (e.g., Hypertext Transfer Protocol (HTTP) for image content, Real Time Protocol (RTP) for video content, and the like).

FIG. 2 depicts a method according to one embodiment of the present invention. Specifically, method 200 includes a method for associating requested content with an end-user content partition. Although described herein as being initiated by an end-user device, in one embodiment, method 200 may be initiated by a network device. Although depicted and described as being performed serially, at least a portion of the steps of method 200 may be performed contemporaneously, or in a different order depicted in FIG. 2. The method 200 begins at step 202 and proceeds to step 204.

At step 204, the EUD generates an available content request message. The available content request message is a request message for identifying content available from the network (e.g., from one or more MCSs). The available content request message may be generated in response to a request initiated by a user using the EUD. For example, an end-user may initiate a request for a list of action movies available to be purchased and/or rented. The available content request message may be generated in response to a request initiated by the EUD (e.g., according to a request pre-configured by the end-user). For example, an end-user may pre-schedule a request for a list of newly released movies which become available from the SPN on a certain date, thereby enabling the EUD to automatically initiate a request for the list of newly released movies (and, optionally, previews of the newly released movies).

At step 206, the EUD transmits the available content request message toward the MCS (or, in some embodiment, transmits a plurality of available content request messages toward a respective plurality of MCSs). At step 208, the MCS receives the available content request message. At step 210, available content is identified. In one embodiment, available content is identified using the available content request message. At step 212, the MCS generates an available content response message or messages. The available content response message, which may also be generally referred to as an end-user directed advertisement, is a response message for advertising content available from the MCS. The available content response message may be generated using the available content request message. The available content response message may identify content (e.g., movies, songs, images, and the like, as well as various combinations thereof) available for purchase, rent, and the like.

In one embodiment, the available content response message may include previews of the available content. In one embodiment, the available content response message may be accompanied by previews of the available content. In such embodiments, for example, previews of available content may include samples of available songs, movie trailers of available movies, and the like. In some such embodiments, previews of available content may be downloaded from one or more MCSs to the EUD, streamed from one or more MCSs to the EUD, and the like, as well as various combinations thereof. In one embodiment, the available content response message may be adapted to enable selection of available content (e.g., selecting available content for purchase, rent, and the like).

At step 214, the MCS transmits the available content response message (or, optionally, available content response messages, previews of available content, and the like) toward the EUD. At step 216, the EUD receives the available content response message. At step 218, the EUD presents the available content to the end-user. The EUD presents available content to the end-user as an advertisement. The EUD presents the available content to the end-user by processing the available content response message. In one embodiment, in which previews of available content accompany the available content response message(s), the EUD processes the available content, facilitating selection of available content (e.g., for purchase, rent, and the like) by the end-user.

At step 220, the EUD generates a content request message. The content request message is a request message for associating selected content with the end-user content partition of the end-user. In one embodiment, the content request message may be generated in response to a request initiated by the end-user from the end-user device. For example, an end-user may initiate a request to rent one of the movies advertised to the end-user by the MCS (i.e., advertised by the MCS using the available content response message). In one embodiment, the content request message may be generated by the EUD (e.g., according to a request pre-set by the end-user). For example, an end-user may pre-order a movie scheduled to become available on a certain date, thereby enabling the EUD to automatically initiate a request for the pre-ordered movie. At step 222, the EUD transmits the content request message toward the MCS.

At step 224, the MCS receives the content request message. At step 226, the MCS identifies the MS (or, in some embodiments, a plurality of MSs) associated with the end-user (i.e., the MS(s) storing the end-user content partition associated with the end-user). In one embodiment, the MCS identifies the MS associated with the end-user using information received as a portion of at least one of the available content request message, the content request message, and the like. In one embodiment, the MCS identifies the MS associated with the end-user using a mapping of the end-user to the associated MS. In such embodiment, the mapping of the end-user to the associated MS may be stored locally by the MCS, centrally within the SPN (e.g., on an end-user profile database), and the like. Although described with respect to specific resources for identifying the MS associated with the end-user, various other resources may be utilized by the MCS for identifying the MS associated with the end-user.

At step 228, the MCS generates a content storage request message. The content storage request message is a request message for determining whether the requested content is stored on the MS associated with the end-user (i.e., on the MS on which the associated end-user content partition is maintained (or MSs, if the end-user content partition spans multiple multi-service servers)). At step 230, the MCS transmits the content storage request message toward the MS on which the associated end-user content partition is maintained. At step 232, the MS receives the content storage request message. At step 234, the MS determines whether the requested content identified in the content storage request message is available (i.e., whether the requested content is already stored by the MS). If the requested content is not available, method 200 proceeds to step 236. If the requested content is available, method 200 proceeds to step 242.

At step 236, the MS generates a content available message. The content available message is a message for informing the MCS that the requested content is already stored on the MS. At step 238, the MS transmits the content available message toward the MCS. From step 238, method 200 proceeds to steps 240 and 256. Although not depicted, in one embodiment, steps 238 and 256 may be performed contemporaneously. At step 240, the MCS receives the content available message. Since the requested content is already stored on the MS, the MCS takes no further action in response to the content available message received from the MS (i.e., the MCS does not retrieve the requested content for transmission to the MS).

At step 242, the MS generates a content request message. The content request message is a message for informing the MCS that the requested content is not already stored on the MS. At step 244, the MS transmits the content request message toward the MCS. At step 246, the MCS receives the content request message. At step 248, the MCS retrieves the requested content. In one embodiment, the MCS retrieves the requested content from one or more local storage module associated with the MCS. In one embodiment, the MCS retrieves the requested content from one or more remote storage modules in communication with the MCS. At step 250, the MCS transmits the requested content toward the MS (or MSs if the end-user content partition spans multiple MSs).

At step 252, the MS receives the content from the MCS. At step 254, the MS stores the content from the MCS in a manner for associating the stored content with the end-user content partition. The MS may store the content within the end-user content partition. The MS may store an indication that the end-user associated with the end-user content partition is authorized to access the stored content. In one such embodiment, the stored indication may be stored within the end-user content partition. The MS may store the content within a common content storage partition (i.e., in such a way that the stored content may be associated with multiple end-user content partitions and, thus, accessed by multiple end-users). In one such embodiment, the MS generates a mapping to the content stored in the common content storage partition (which may also be denoted as a common content partition or a common storage partition). The mapping may then be stored in the end-user content partition, enabling later retrieval, by the end-user, of the content from the common content partition. At step 256, method 200 ends.

Figure 3:
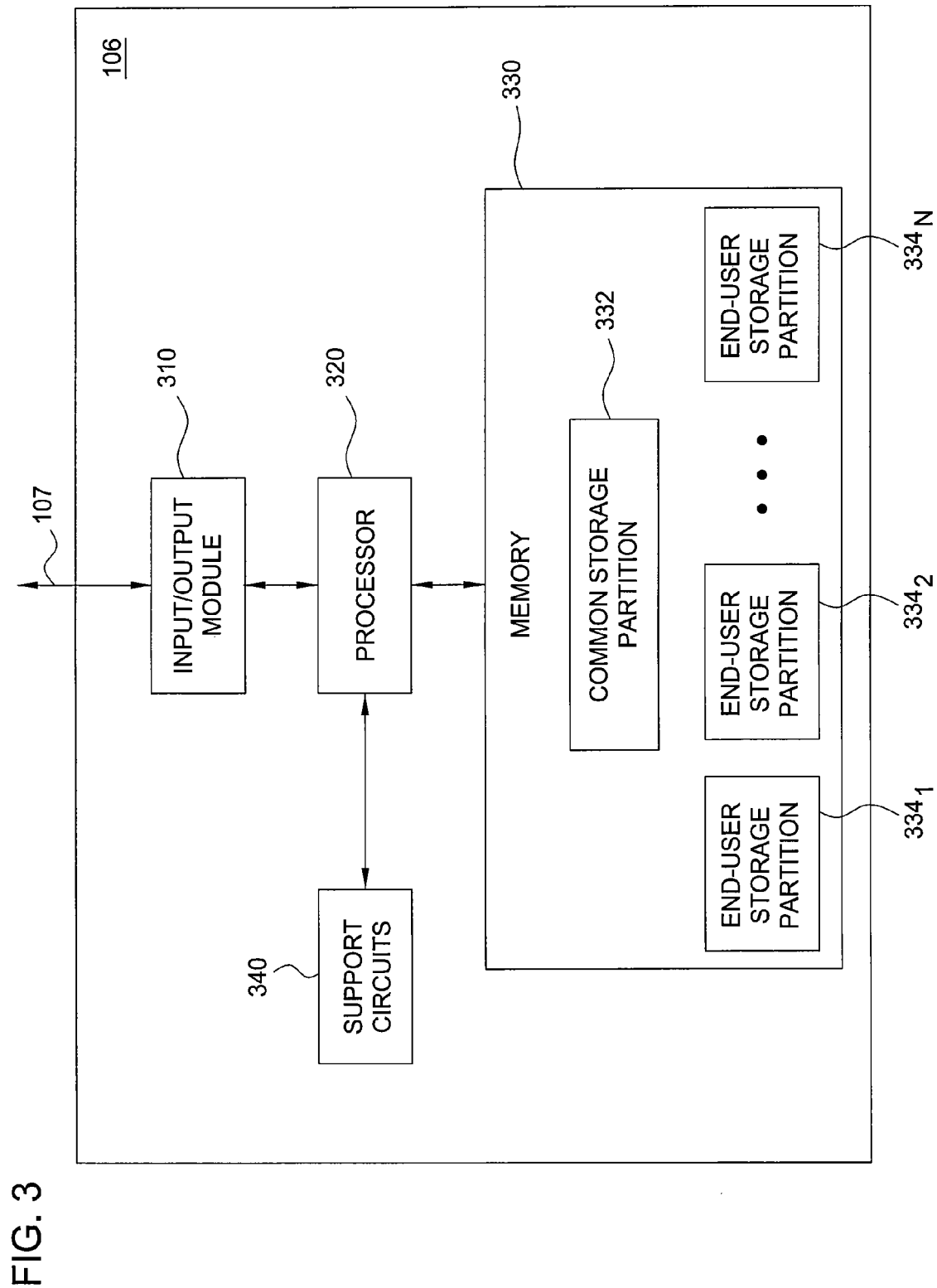
FIG. 3 depicts a high-level block diagram of a multi-service server according to one embodiment of the present invention.

FIG. 3 depicts a high-level block diagram of a multi-service server according to one embodiment of the present invention. Specifically, MS 106 of FIG. 3 includes an input-output module (IOM) 310, a processor 320, a memory 330, and support circuits (SCs) 340. The processor 320 interfaces with IOM 310, memory 330, and SCs 340 for performing various functions depicted and described herein with respect to MSs 106. The memory 330 includes a common storage partition 332 and a plurality of end-user storage partitions $334_1$-$334_N$ (collectively, end-user storage partitions 334). The common storage partition may alternatively be referred to herein as a common content partition or a common content storage partition. The end-user storage partitions may alternatively be referred to herein as end-user content partitions or end-user content storage partition.

As described herein, common storage partition 332 and end-user storage partitions 334 may be implemented as physical partitions, logical partitions, as well as various combinations thereof. Although one common storage partition is depicted for purposes of clarity, in one embodiment, MS 106 may include multiple physical and/or logical common storage partitions. Although, for purposes of clarity, one end-user-storage partition is depicted for each end-user, MS 106 may include multiple physical and/or logical end-user storage partitions for each end-user.

Figure 4:
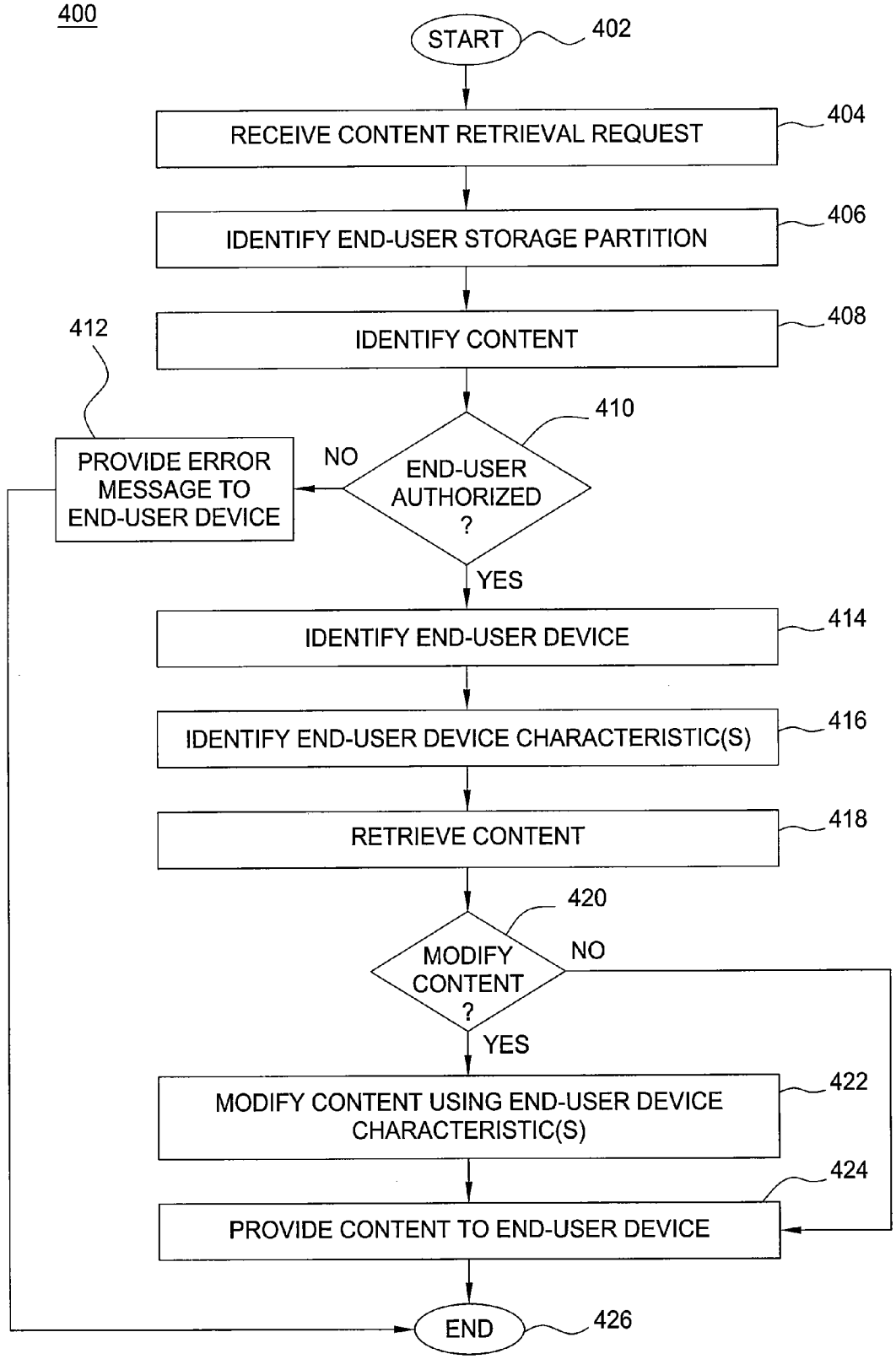
FIG. 4 depicts a method according to one embodiment of the present invention.

FIG. 4 depicts a method according to one embodiment of the present invention. Specifically, method 400 includes a method for retrieving content from an end-user content partition of a multi-service server. Although not specifically described, one or both of non-end-user generated content (i.e., content generated by a content owner or content provider and transferred from a media content server to a multi-service server) and end-user generated content (i.e., content generated by an end-user and transferred from an end-user device to a multi-service server). Although depicted and described as being performed serially, at least a portion of the steps of method 400 may be performed contemporaneously, or in a different order depicted in FIG. 4. The method 400 begins at step 402 and proceeds to step 404.

At step 404, a content retrieval request is received. The content retrieval request is received at an MS on which the associated end-user content partition is stored. The content retrieval request may be received directly from an EUD, or may be received indirectly (e.g., redirected from another MS if the end-user content partition spans multiple MSs, redirected from an authentication server, redirected from a proxy server, or redirected from another network element which initially receives the content retrieval request from the EUD, and the like, as well as various combinations thereof).

At step 406, the end-user content partition is identified. The end-user content partition may be identified using information received in the content retrieval request (e.g., end-user identifier, end-user content partition identifier, EUD identifier, and the like, as well as various combinations thereof).

At step 408, content (i.e., content requested to be retrieved by the end-user) is identified. The content requested to be retrieved by the end-user is identified using the content retrieval request. The content requested to be retrieved by the end-user may include one or both of non-end-user generated content (i.e., content generated by a content owner or content provider and transferred from a media content server or other network-based device to a multi-service server) and end-user generated content (i.e., content generated by an end-user and transferred from an end-user device to a multi-service server).

At step 410, a determination is made as to whether the end-user is authorized to retrieve the content identified in the content retrieval request. In one embodiment, the determination is made as to whether the end-user is authorized to retrieve the content identified in the content retrieval request may be made by searching the end-user content partition for the content identified in the content retrieval request. The determination is made as to whether the end-user is authorized to retrieve the content identified in the content retrieval request may be made using various other authorization techniques. If the end-user is not authorized to retrieve the content, method 400 proceeds to step 412. At step 412, the EUD provides an error message to the EUD from which the content retrieval request is received. From step 412, method 400 proceeds to step 426, where method 400 ends. If the end-user is authorized to retrieve the content, method 400 proceeds to step 414.

At step 414, the EUD (i.e., from which the content retrieval request was received) is identified. The end-user content partition may be identified using information received in the content retrieval request (e.g., end-user identifier, end-user content partition identifier, and the like, or various combinations thereof). At step 416, an end-user device characteristic(s) associated with the identified EUD is identified. The EUD characteristic(s) may include at least one characteristic which may impact delivery and/or presentation of the requested content (e.g., EUD receiver capabilities, EUD content processing capabilities, EUD content storage capacity, EUD content presentation interface characteristics (e.g., screen size, resolution, and the like), and the like, as well as various combinations thereof. The EUD characteristic(s) may be identified using information received in the content retrieval request, additional signaling between the MS and the EUD, and the like.

At step 418, the content requested by the end-user in the content retrieval request is retrieved. As described herein, the content may be retrieved from the end-user content partition of the MS, from a common storage partition of the MS (e.g., using a mapping from the end-user content partition to the common storage partition (e.g., content indexing and like mapping functions), and the like, as well as various combinations thereof). In one embodiment, in which the end-user is authorized to access the requested content but the content requested by the end-user is not available on the MS, the MS may retrieve the requested content from another network device (e.g., another MS if the end-user content partition spans multiple MSs, an MCS, and the like, as well as various combinations thereof).

At step 420, a determination is made as to whether to modify content retrieved in response to the content retrieval request. The determination as to whether to modify retrieved content may be performed using one or more of the EUD characteristics associated with the EUD from which the content retrieval request is received. For example, in response to a determination that the EUD is a mobile phone (e.g., a device having a small screen size relative to other EUDs such as computer monitors and televisions), a determination the retrieved content may be modified to fit the smaller screen size of the mobile phone. If the content retrieved in response to the content retrieval request is not modified, method 400 proceeds to step 424. If the content retrieved in response to the content retrieval request is modified, method 400 proceeds to step 422.

At step 422, the content retrieved in response to the content retrieval request is modified using the EUD characteristic(s). In one embodiment, for example, in response to a determination that the EUD is a mobile phone with a small screen size relative to other EUDs such as computer monitors and televisions, the retrieved content may be modified in a manner such that the content better fits the smaller screen size of the mobile phone. Although only described with respect to one form of modification, various other modifications may be made to the retrieved content (e.g., using different encoding formats, transport protocols, and the like, as well as various combinations thereof).At step 424, the retrieved content is provided to the EUD from which the content retrieval request is received. The retrieved content may be provided using any means of conveying content from a network device to the EUD (e.g., using any encoding, protocol, and the like). From step 424, method 400 proceeds to step 426, where method 400 ends.

Although primarily depicted and described herein with respect to specific messages, communication between components (e.g., between network components, between network components and EUDs, and the like) may be performed using various other communication functions. In one embodiment, for example, communication described herein as being performed using a single message may be performed using a plurality of messages, packets, and the like, as well as various other equivalent signaling means for achieving the described result. As such, the present invention is not intended to be limited by specific communication messages depicted and described herein, rather, various equivalent communication means may be employed for supporting communications depicted and described herein.

As described herein, the present invention enables improvements to existing multimedia services, support for new multimedia services, and the like, as well as various combinations thereof. The improvements to existing multimedia services, support for new multimedia services, and the like may be better understood with respect to the following examples. Although depicted and described herein with respect to specific networks, network elements, end-user devices, protocols, signaling, messaging, content, and services, the present invention is not limited to the networks, network elements, end-user devices, protocols, signaling, messaging, content, and services described in the following examples.

In one embodiment, as described herein, the present invention enables improved media streaming capabilities. In existing media streaming solutions, multimedia content is streamed from server to client across the Internet. In such existing media streaming solutions, streaming media may traverse multiple networks and network domains (e.g., multiple service provider networks) between the server and client, thereby preventing guaranteed quality of service, increasing latency, increasing bottleneck probabilities, and the like. The present invention avoids such problems associated with existing media streaming solutions by providing multimedia content directly from MSs (which may be located close to EUDs, i.e., near EUD network access points) to EUDs such that multimedia content traverses only a small portion of the network under the control of one service provider, thereby enabling high-quality services (such as high quality streaming media) to be more efficiently provided to end-users.

In one embodiment, as described herein, the present invention enables improved end-user content backup and access capabilities. The per-end-user storage space (e.g., end-user storage partition) enables end-users to store one or both of non-end-user generated content and end-user generated content. The non-end-user generated content may include text, images, audio clips, videos (e.g., clips, television programs, movies, and the like), and the like, as well as various combinations thereof. The non-end-user generated content may include any content available from the Internet (e.g., content available from websites, streaming content available from content providers (e.g., television stations, movie studios, and the like, as well as various combinations thereof). The end-user generated content may include personal content created by the user and uploaded to the network for storage on the end-user storage partition (e.g., personal documents, pictures, videos, and the like, as well as various combinations thereof).

Using the present invention, encryption may be utilized to protect both non-end-user generated content (e.g., copyrighted content) and end-user generated content (e.g., for end-user privacy reasons). Since, using the present invention, the end-user content partition and, therefore, content available to the end-user, is located close to at least one of the EUDs used by the end-user to access the service provider network, the bandwidth between storage and end-user may be significantly increased while the delay between storage and end-user may be significantly decreased (neither result being achievable using existing media storage solutions). As described herein, using the present invention, end-users may access storage content from one or more MSs using different EUDs associated with the end-user, and the MSs are adapted for delivering requested content to the EUDs in respective formats suitable for the respective EUDs.

In one embodiment, as described herein, the present invention enables new content advertising, preview, and sales services. Using the present invention, service providers may provide available content to EUDs (e.g., providing previews of available content to mobile phones, computers, and the like). In one embodiment, available content may be provided by the service provider on behalf of content owners such as record companies, television stations, movie companies, and the like, as well as various combinations thereof. The available content may be requested by the end-user using an EUD or pushed to the EUD (e.g., by a service provider, content owner, content provider, and the like).

In one embodiment, full media clips may be pushed to EUDs (e.g., an entire sample song may be pushed to an EUD to advertise the song or the record album on which the song is released). In one embodiment, partial media clips may be pushed to an EUD (e.g., a chorus of a song may be pushed to an EUD to advertise the full song, a movie trailer may be pushed to an EUD to advertise the full movie, and the like) .The requested or pushed content (e.g., full or partial media clips) may be accompanied by or followed by an option to rent or purchase the content, or additional content associated with the pushed content, (e.g., purchasing a record album on which the advertised song is included).

In one embodiment, options to rent or purchase content advertised to EUDs may be activated using a hardware interface on the EUD, a software interface on the EUD, or a combination of hardware and software interfaces. For example, the end-user may rent or purchase advertised (or, alternatively, unadvertised) content by clicking a button, typing one or more keys, issuing a voice command, and the like, as well as various combinations thereof. Upon renting or purchasing the advertised content, the rented or purchased content may be deposited into an end-user storage area (e.g., depositing the content from a MCS onto one or more MSs on which the associated end-user content partition is maintained).

In one embodiment, as described herein, the present invention enables new content gifting services (enabling end-users to purchase media content and send the purchased media content to one or more end-users as a gift. For example, a first end-user purchases content with an indication that the content is intended as a gift for a second end-user. The request to provide the purchased content as a gift to the second end-user may be provided to the MCS on which the content is purchased (e.g., which communicates with the MS(s) on which the end-user content partition of the second end-user is maintained), the MS(s) on which the end-user content partition of either the first or second end-user is maintained, one or more other servers adapted for processing the content gifting request and coordinating appropriate actions by the MCS and MS(s) on which the end-user content partition of the second end-user is maintained.

In this embodiment, the gifted content is deposited from the MCS to the one or more MS(s) on which the end-user content partition of the second end-user is maintained. As described herein, gifted content, like purchased content, end-user generated content, and the like, may include any content. As described herein, the gifted content may be stored in one of an end-user content partition associated with the second end-user, a common content partition mapped in end-user content partition associated with the second end-user, and the like, as well as various combinations thereof. Using the present invention, the second end-user may then immediately access the gifted content from any location using any EUD (e.g., without even having to login to a website to download the gifted media content).

The present invention provides significant benefits to service providers. The service provider, by implementing, maintaining, and managing multi-service per-end-user storage (e.g., in the form of end-user content partitions), may improve end-user loyalty (e.g., due to new and improved services, and, optionally, due to an increasing difficulty of changing service providers as a result of significant quantities of content stored by the current service provider). The service provider, by implementing, maintaining, and managing multi-service per-end-user storage, may offer a host of revenue generating services to end-user, such as content advertising, rental, sales, data backup services, and the like, as well as various combinations thereof.

The present invention provides significant benefits to content owners. The present invention provides content owners more options for advertising content, while simultaneously providing end-users with more options for previewing, renting, and purchasing advertised content, enabling increases in content rental and sales over existing solutions. The present invention enables improved anti-piracy measures for content owners (e.g., end-users access the content from secure MSs which provide more security features than existing MCSs from which end-user currently obtain content). For example, anti-piracy measures supported by the present invention may prevent illegal distribution of new record albums, movies, and like content.

The present invention provides significant benefits to end-users. The present invention provides end-users with increased flexibility in purchasing and renting media content (e.g., enabling end-users to preview and content on any device, even on public computers, purchase or rent the previewed content, and have the purchased or rented content stored in a personal content storage space dedicated to the end-user). The end-user may then access the content from any device. For example, if the end-user accesses the content from home, where the end-user subscribes to a high-speed Internet connection (e.g., cable, DSL, optical fiber to the home, and the like), since the end-user content partition is implemented close to the end-user, the connection speed may be fast enough to support real-time streaming of high-definition content (e.g., movies, television programs, and the like).

The present invention provides additional benefits to end-users in the form of personal content storage, management, and retrieval capabilities (e.g., enabling end-users to store and retrieve personal documents, photographs, videos, and the like, as well as various combinations thereof). For example, an end-user on vacation may not want to bring a large number of recordable disks for the video camera, limiting the amount of video footage that the end-user may shoot. Using the present invention, the end-user may upload video content from the video camera to the end-user content storage partition using a network connection in the hotel, thereby enabling the end-user to record and storage as much video footage as the end-user desires. Similar examples may be contemplated for other content generated by end-users.

As described herein, although depicted and described with respect to use of specific physical and or logical server and storage device partitions, the end-user content partitions of the present invention may be implemented using various other server and storage device partitioning techniques. Although primarily depicted and described herein using embodiments in which end-user content storage is implemented using respective end-user content partitions associated with respective end-users, in other embodiments, end-user content storage may be implemented using various other content storage techniques adapted for associating content with end-users and for supporting content storage, management, and retrieval functions depicted and described herein with respect to the present invention.

Figure 5:
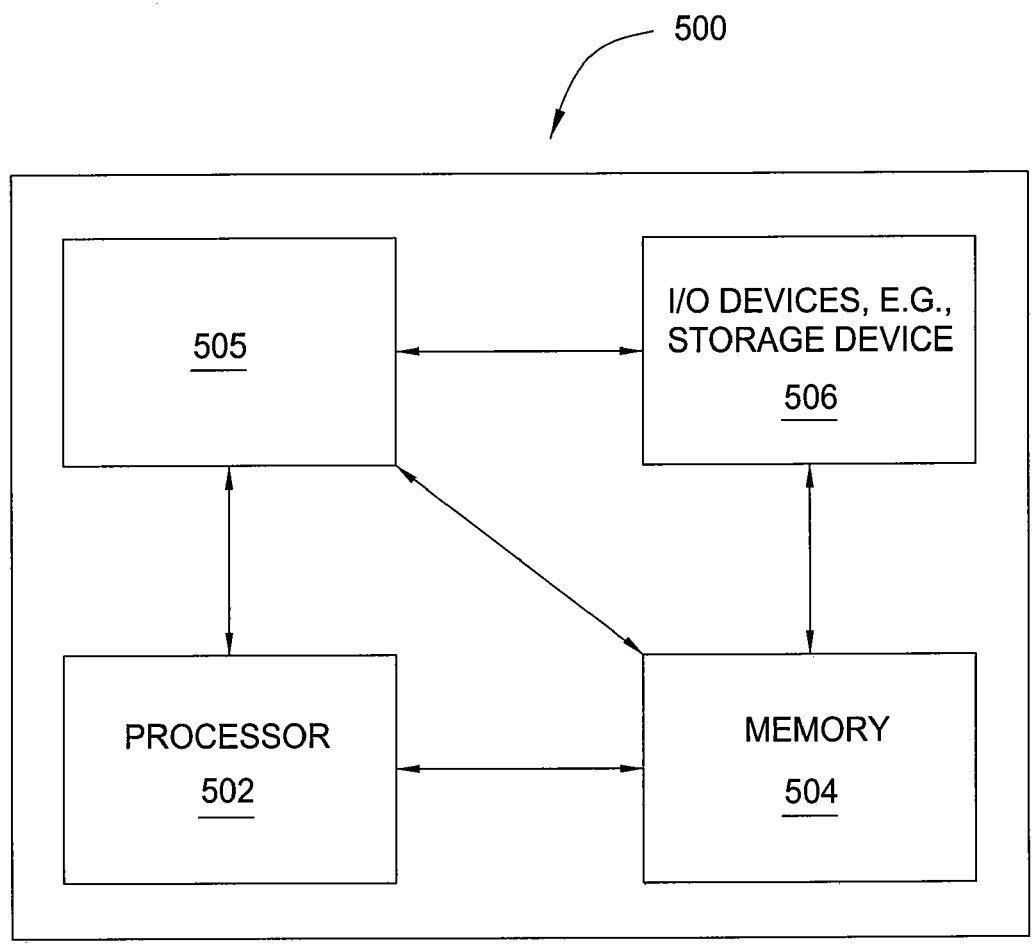
FIG. 5 depicts a high-level block diagram of a general-purpose computer suitable for use in performing at least a portion of the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a multi-service content management module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present multi-service content management module or process 505 can be loaded into memory 504 and executed by processor 502 to implement the functions as discussed above. As such, multi-service content management process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A system for storing media content within a service provider network, comprising:
   a plurality of multi-service servers associated with access points adapted to allow end-user devices to access the service provider network, each multi-service server comprising a common storage partition adapted for storing media content, each multi-service server comprising a plurality of end-user storage partitions, each end-user storage partition adapted for storing associations to portions of the media content in the common storage partition; and
   a plurality of media servers, at least a portion of the media servers being disposed within the service provider network, the media servers adapted for communicating with the multi-service servers for providing media content to the multi-service servers for storage in the respective common storage partitions of the multi-service servers;
   wherein, in response to a request for media content received from an end-user device, the requested media content stored in the common storage partition of one of the multi-service servers having an end-user partition associated with the end-user device is associated with the end-user storage partition associated with the end-user device.

2. The system of claim 1, wherein each multi-service server is further adapted for, in response to a request for media content, performing:
   determining whether the requested media content is stored within the common storage partition.

3. The system of claim 1, wherein each multi-service server is further adapted for, in response to a determination that requested media content is stored within the common storage partition:
   generating a mapping to the requested media content stored in the common storage partition; and
   storing the generated mapping in an end-user storage partition associated with an end-user device from which a request for the media content is received.

4. The system of claim 1, wherein each multi-service server is further adapted for, in response to a determination that requested media content is not stored within the common storage partition:
   obtaining the requested media content;
   storing the obtained media content in the common storage partition;
   generating a mapping to the media content stored in the common storage partition; and
   storing the generated mapping in an end-user storage partition associated with an end-user device from which a request for the media content is received.

5. The system of claim 1, wherein each multi-service server is further adapted for:
   receiving a media content retrieval request from one of the end-user devices requesting retrieval of at least a portion of the media content;
   identifying the end-user storage partition associated with the end-user associated with the end-user device from which the media content retrieval request is received;
   retrieving the requested portion of the media content; and
   providing the requested portion of the media content to the one of the end-user devices requesting retrieval of the at least a portion of the media content.

6. The system of claim 1, wherein each multi-service server is further adapted for:
   receiving end-user content from an end-user device associated with an end-user;
   identifying the end-user storage partition associated with the end-user; and
   storing the received end-user content in the end-user storage partition.

7. A method for storing media content on a server within a service provider network, the server comprising a common storage partition adapted for storing media content and a plurality of end-user storage partitions adapted for maintaining associations to portions of the media content, wherein the server is associated with at least one access point adapted to allow end-user devices to access the service provider network, the method comprising:
   receiving a request to store media content in response to a request for the media content initiated by an end-user using an end-user device;
   determining, in response to the request to store media content, whether the media content is stored in the common storage partition; and
   in response to a determination that the requested media content is not stored in the common storage partition, storing the requested media content in the common storage partition and associating the stored media content with the end-user storage partition associated with the end-user;
   in response to a determination that the requested media content is stored in the common storage partition, associating the stored media content with the end-user storage partition associated with the end-user.

8. The method of claim 7, wherein associating the stored media content with the end-user storage partition comprises:
   generating a mapping to the media content stored in the common storage partition; and
   storing the generated mapping in the end-user storage partition associated with the end-user.

9. The method of claim 7, further comprising, in response to a determination that the media content is not stored in the common storage partition:
   obtaining the media content;
   storing the obtained media content in the common storage partition;
   generating a mapping to the media content stored in the common storage partition; and
   storing the generated mapping in the end-user storage partition associated with the end-user.

10. The method of claim 7, further comprising:
    receiving a media content retrieval request, from one of the end-user devices, requesting retrieval of at least a portion of the media content;
    identifying the end-user storage partition associated with the end-user associated with the end-user device from which the media content retrieval request is received;
    retrieving the requested portion of the media content; and
    providing the requested portion of the media content to the one of the end-user devices requesting retrieval of the at least a portion of the media content.

11. The method of claim 10, further comprising:
    determining at least one device characteristic of the one of the end-user devices requesting retrieval of at least a portion of the media content; and
    modifying the requested portion of the media content according to the at least one device characteristic.

12. The method of claim 7, further comprising:
    receiving end-user content from one of the end-user devices;
    identifying the end-user storage partition associated with the end-user associated with the end-user device from which the end-user content is received; and
    storing the received end-user content in the end-user storage partition.

13. An apparatus for storing media content within a service provider network, the apparatus comprising a common storage partition adapted for storing media content and a plurality of end-user storage partitions adapted for maintaining associations to portions of the media content, wherein the apparatus is associated with at least one access point adapted to allow end-user devices to access the service provider network, the apparatus comprising:
    means for receiving a request to store media content in response to a request for the media content initiated by an end-user using an end-user device; and
    means for determining, in response to the request to store media content, whether the media content is stored in the common storage partition;
    means for storing the requested media content in the common storage partition and associating the stored media content with the end-user storage partition associated with the end-user, in response to a determination that the requested media content is not stored in the common storage partition; and
    means for associating the stored media content with the end-user storage partition associated with the end-user, in response to a determination that the requested media content is stored in the common storage partition.

14. The apparatus of claim 13, wherein means for associating the stored media content with the end-user storage partition associated with the end-user comprises:

means for generating a mapping to the media content stored in the common storage partition; and means for storing the generated mapping in the end-user storage partition.

15. The apparatus of claim 13, further comprising:

means for obtaining the media content, in response to a determination that the media content is not stored in the common storage partition.

16. The apparatus of claim 13, further comprising:

means for receiving a media content retrieval request, from one of the end-user devices, requesting retrieval of at least a portion of the media content;

means for identifying the end-user storage partition associated with the end-user associated with the end-user device from which the media content retrieval request is received;

means for retrieving the requested portion of the media content; and means for providing the requested portion of the media content to the one of the end-user devices requesting retrieval of the at least a portion of the media content.

17. The apparatus of claim 13, further comprising:

means for receiving end-user content from one of the end-user devices;

means for identifying the end-user storage partition associated with the end-user associated with the end-user device from which the end-user content is received; and means for storing the received end-user content in the end-user storage partition.

* * * * *

UNITED STATES PATENT AND TRADEMARK OFFICE
CERTIFICATE OF CORRECTION

PATENT NO. : 7,613,735 B2 Page 1 of 1
APPLICATION NO. : 11/423746
DATED : November 3, 2009
INVENTOR(S) : Bin Yao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 276 days.

Signed and Sealed this

Nineteenth Day of October, 2010

David J. Kappos
*Director of the United States Patent and Trademark Office*